Aug. 24, 1965
A. J. GALLEN ETAL
3,202,897
CONTROL SYSTEM FOR A CIRCUIT INTERRUPTER OPERATOR
Filed Aug. 24, 1962
4 Sheets-Sheet 2
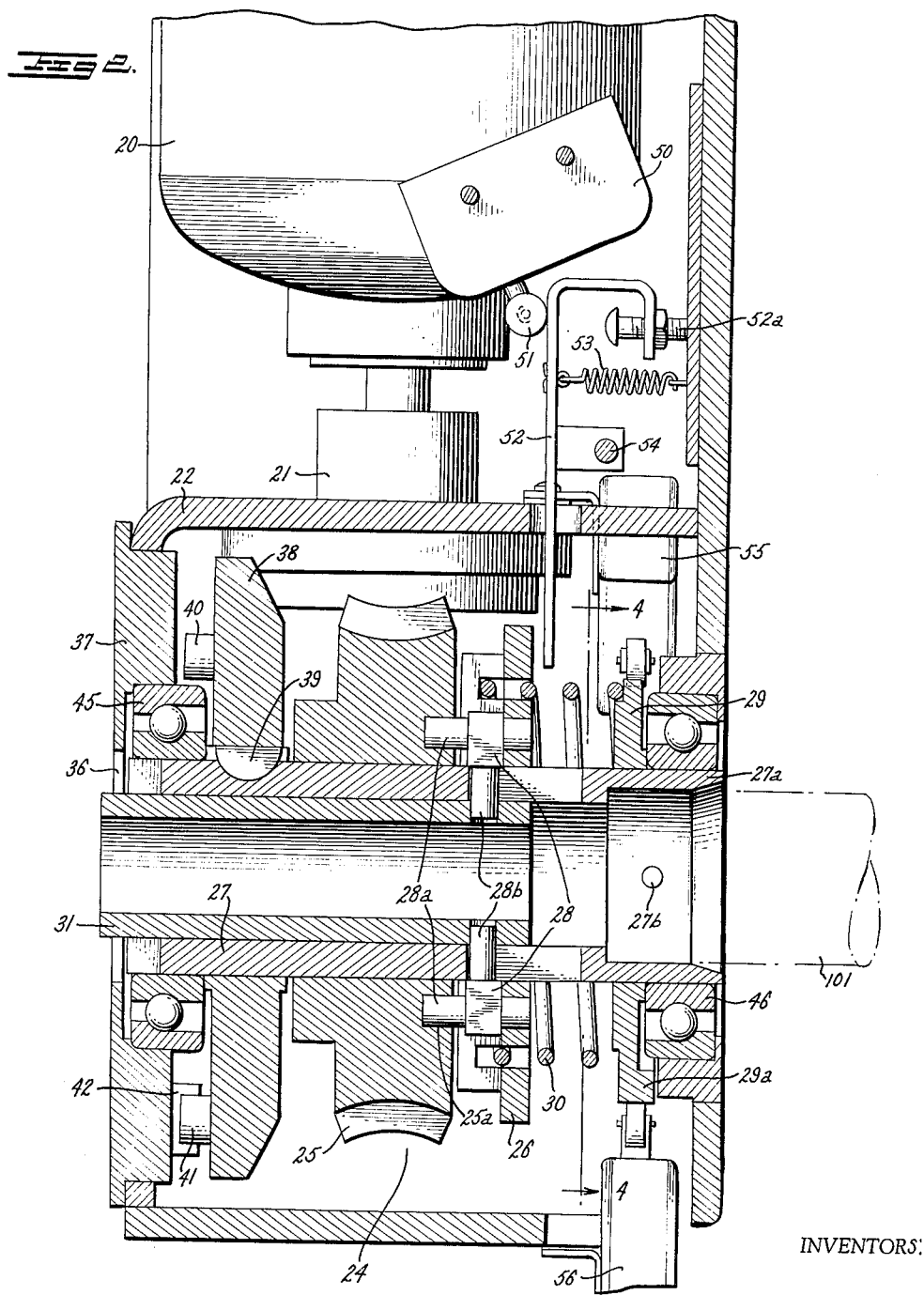
INVENTORS:
ALEXANDER J. GALLEN,
EUGENE T. McCURRY,
HAROLD N. SCHNEIDER,
BY Irving H Marshman
ATTORNEY.

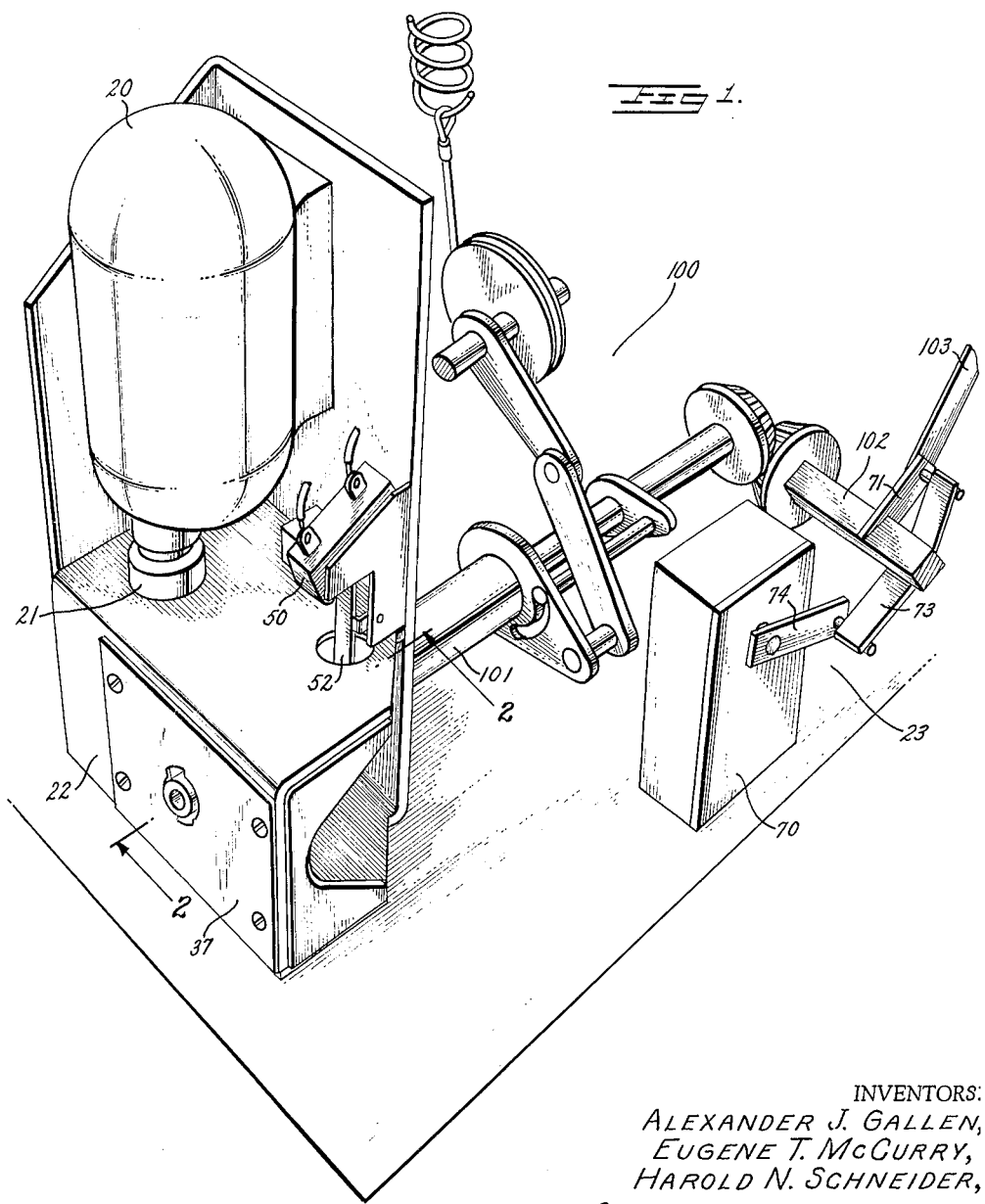

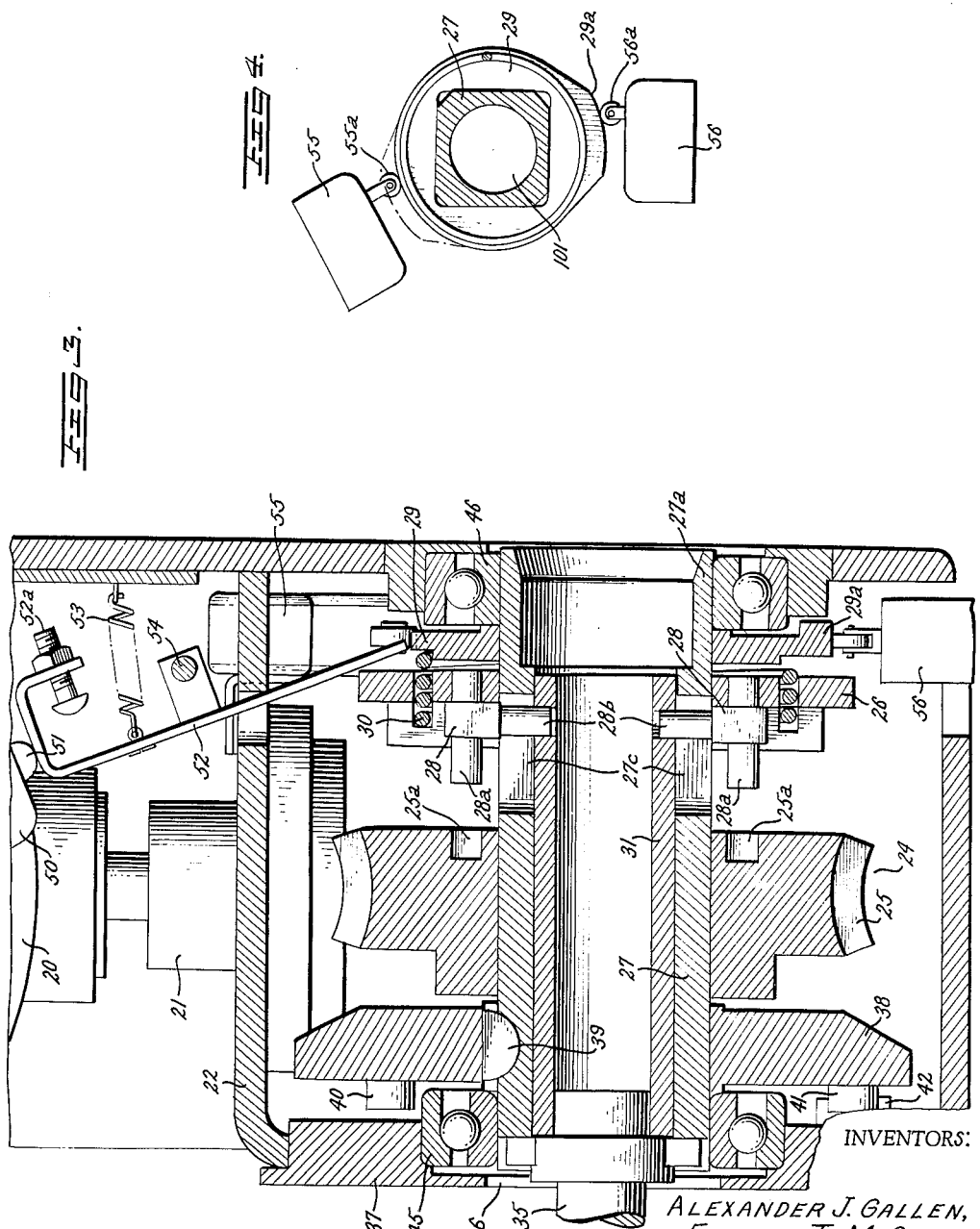

Aug. 24, 1965
A. J. GALLEN ETAL
3,202,897
CONTROL SYSTEM FOR A CIRCUIT INTERRUPTER OPERATOR
Filed Aug. 24, 1962
4 Sheets-Sheet 4
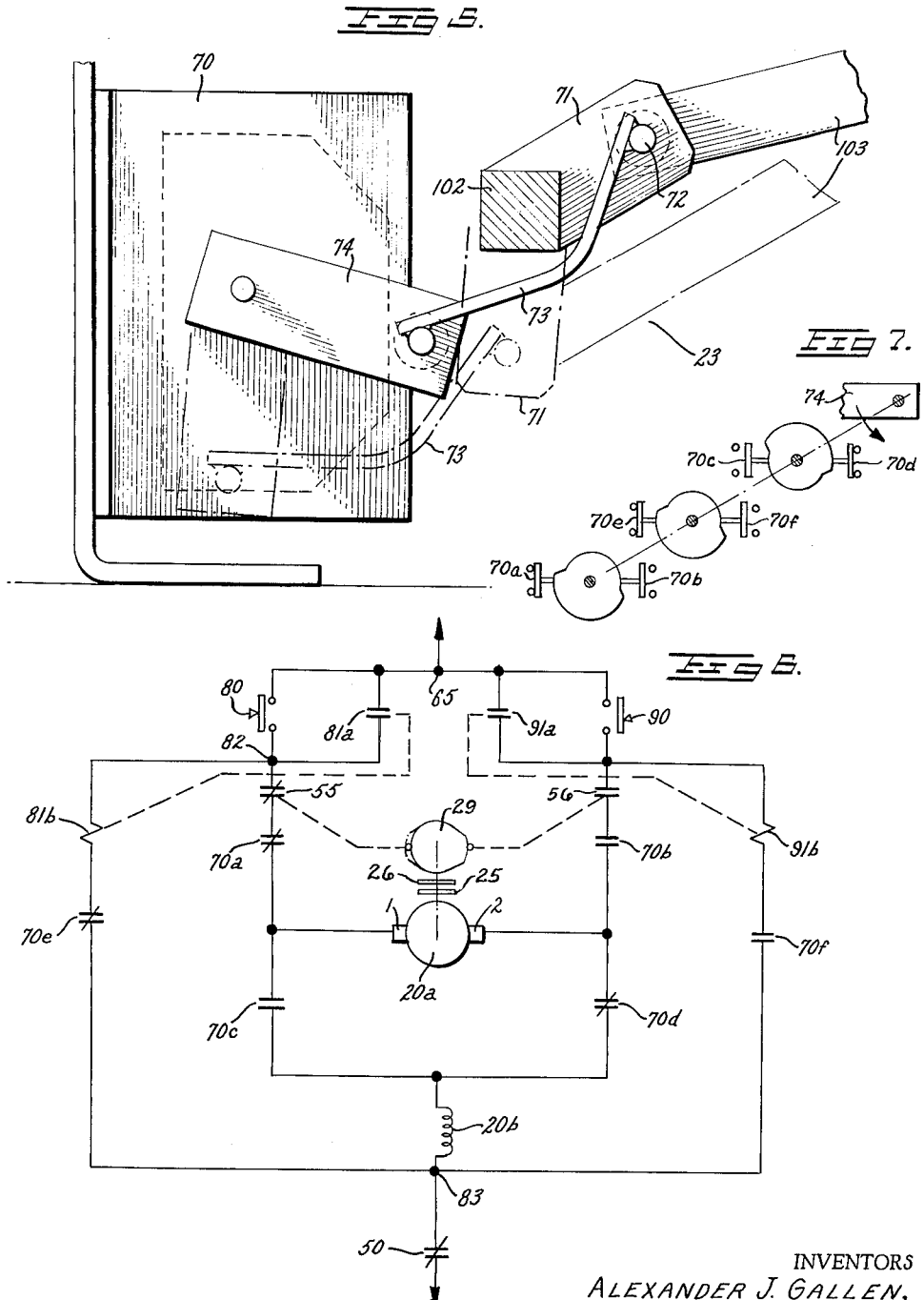
INVENTORS
ALEXANDER J. GALLEN,
EUGENE T. McCURRY,
HAROLD N. SCHNEIDER,
BY Irving H Marshman
ATTORNEY.

United States Patent Office

3,202,897
Patented Aug. 24, 1965

3,202,897
CONTROL SYSTEM FOR A CIRCUIT
INTERRUPTER OPERATOR
Alexander J. Gallen, Sharon Hill, Del., and Eugene T. McCurry, Newtown Square, and Harold N. Schneider, Springfield, Pa., assignors to General Electric Company, a corporation of New York
Filed Aug. 24, 1962, Ser. No. 219,265
7 Claims. (Cl. 318—267)

This invention relates to a control system for a circuit interrupter operator and more particularly to a control system adapted to permit manual or electrical charging of a stored energy device used in the operation of medium and large circuit interrupters. One example of such a stored energy device is shown in Patent No. 2,972,259, issued to John A. Favre and assigned to the assignee of the instant invention.

For purposes of flexibility in operation, it is desirable to provide electrical apparatus which permits remote operation of interrupter stored energy devices as well as manual means of operation. A reversible motor connected to a drive unit which is also capable of manual operation may be used for this purpose. To provide prompt interrupter response to load conditions, a control system is desirable by which a reverse operation of the motor may immediately follow either a manual or electrical opening or closing of the interrupter. Also, the control system may include means to insure that no electrical operation can take place during a manual operation.

Furthermore, it is desirable that a seal-in or holding means be provided to maintain the supply of the current to the motor control circuits in response to an instantaneous closing of a control switch by either an operator or automatically by load conditions. For example, where an instantaneous overload condition sends an electrical pulse to the motor control circuit it is desirable that this pulse be sufficient automatically to close the control circuit to its power source assuring complete operation of the motor to cause charging of the stored energy device and subsequent opening of the circuit interrupter.

Where an electric motor is used to charge a stored energy device accurate timing of motor cutoff prevents energization of the motor control circuit regardless of the conditions of the interrupter.

Accordingly, it is an object of our invention to provide an improved control system for a circuit interrupter operator.

It is a further object to provide a control system for a stored energy circuit interrupter operator which is reliable and compact and readily installed on the interrupter to provide either manual or electrical operation thereof.

It is still another object of our invention to provide a control system for a circuit interrupter operator which, upon completion of either a manual or electrical operation of the interrupter, the operator is instantaneously prepared to provide electrical operation of the interrupter to the next position.

It is yet another object of our invention to provide a control mechanism for a circuit interrupter operator whereby no electrical operation of the stored energy device may be initiated during manual operation of said device.

It is a further object of our invention to provide a control system for a circuit interrupter operator having a seal-in means by which the instantaneous delivery of current to a motor control circuit will be sufficient to insure delivery of current to the motor unitl the stored energy device has been charged.

Briefly, in one form, our invention comprises a reversible motor and drive which may be attached to a stored energy operated circuit interrupter for manual or electrical charging of the stored energy device and a plurality of switching means for controlling the energization of two motor control circuits by the discharge of the stored energy device and the operation of the drive. The motor control circuits permit operation of the motor in either direction to charge the stored energy device for either opening or closing of the interrupter. An auxiliary switch having a plurality of contact pairs, is actuated by the discharge of the stored energy device at the same time as the circuit interrupter to prepare the motor control circuit needed for reverse operation while opening its contacts in the other circuit.

Additionally, two limit switches, mounted within the drive housing so as to be actuated by rotation of the drive means, provide for motor cutoff at the time of completion of the energy storage operation. A de-clutching apparatus opens the motor circuits during manual operation to prevent electrical operation during manual charging of the stored energy device. A pair of seal-in or holding circuits are used, one related to each of the motor control circuits. One pair of auxiliary switch contact pairs are located in each holding circuit.

For a better and more complete understanding of the invention, reference should now be had to the following specification and to the accompanying drawings in which:

FIG. 1 is a perspective view of our invention shown in cooperaton with a circuit interrupter stored energy device which may be of any form;

FIG. 2 is an enlarged fragmentary cross-sectional view of the drive unit of our invention taken on line 2—2 of FIG. 1;

FIG. 3 is similar to that of FIG. 2 with the drive being shown in its manually operated position;

FIG. 4 is an enlarged cross-sectional view of certain elements of our invention taken on line 4—4 of FIG. 2;

FIG. 5 is an enlarged view of the auxiliary switch of our invention taken on line 5—5 of FIG. 1;

FIG. 6 is a circuit diagram of one form of our invention, and

FIG. 7 is a diagrammatic sketch of the auxiliary switch of FIG. 5 that facilitates an understanding of the operation of the invention.

*Drive unit*

As mentioned above our invention embodies a motor and drive unit which may be readily adapted to a manually operated stored energy mechanism of a circuit interrupter such as shown in Patent No. 2,972,259 to provide manual or motor operation thereof. The majority of the elements of our invention are enclosed in the motor and drive units shown in FIG. 1 in which a reversible motor is shown at 20, connected by coupling 21 to a drive unit in drive housing 22. The auxiliary switching means, shown generally at 23 and to be discussed later, is located within the interrupter housing.

A stored energy device to which our invention may be adapted is shown in one form at 100. The hub 101 of the stored energy device is connected to the drive unit, within housing 22 to be charged thereby. Discharge of the device 100 causes rotation of the switch shaft 102 which operates the interrupter switch blade (not shown) and auxiliary switch 23. Clockwise rotation of hub 101 as viewed from the righthand end thereof in FIGS. 1 and 2 charges the stored energy mechanism in preparation for opening of the interrupter and counterclockwise rotation charges the stored energy mechanism to close the interrupter.

During electrical operation, i.e. by motor 20, the drive unit shown generally in FIG. 2 at 24, drives the hub 101 of the stored energy device to the charged position.

Coupling 21 connects the motor armature to worm gear 25. Rotary motion is transmitted from worm gear 25 to clutch disc 26 which is affixed to hollow drive shaft 27. The right end 27a of drive shaft 27 is hollow and adapted to receive hub 101 of the stored energy device 100, being secured thereto by a pair of pins 27b.

The complete clutch assembly includes clutch disc 26, a pair of L-pins 28, a spring retainer plate 29 having a peripheral cam surface 29a and a spring 30 which normally biases clutch disc 26 away from plate 29.

L-pins 28 embody horizontal portions 28a and vertical portions 28b. The horizontal portions 28a produce a rotary driving connection between worm gear 25 and clutch disc 26 by cooperation with recesses 25a of worm gear 25. The vertical portions 28b of the L-pins 28 are utilized as a connecting means between clutch disc 26 and slidable element or shaft 31 to be discussed later.

The clutch disc 26 and retainer plate 29 are fixed to a squared portion of shaft 27 and consequently rotate with it. Shaft 27 is otherwise of circular cross-section and worm gear 25 is freely rotatable thereon.

To thoroughly understand the inter-relationship and purposes of the foregoing elements it is necessary to explain the manual operation of the drive 24. The position of the drive elements during manual operation is shown in FIG. 3. To initiate manual operation a hand crank of any type a portion of which is shown at 35, is inserted within the drive housing 22 through an aperture 36 in face plate 37. By applying horizontal pressure against the crank 35, the slidable shaft 31, being in engagement with vertical portions 28b of L-pins 28 which are in turn engaged with clutch disc 26, moves disc 26 to the right. This moves the L-pins of the clutch disc 26 out of engagement with the recesses 25a of worm gear 25 against the bias of spring 30. It should be noted that two slots 27c are provided in drive shaft 27 to permit the sliding of L-pins 28 therein. The horizontal drive shaft 27 does not move axially.

During the inward motion of the slidable shaft 31 under the pressure of crank 35, the crank is rotated in the desired direction of switch operation. Rotary motion of the crank 35 effects rotation of slidable shaft 31 which in turn rotates drive shaft 27 through the vertical portions 28b of L-pins 28.

A disc-shaped detent device 38 is fixed to drive shaft 27 by any suitable means such as the key 39. The detent device 38, which thus rotates with drive shaft 27 during either motor or manual operation, carries a pair of stops 40 and 41 which may abut a projecting element 42 on the inner surface of face plate 37. The abutment of stops 40 or 41 against element 42 limits the rotation of the drive in either direction to terminate coasting of the drive 24 and stored energy device hub upon motor cutoff at the completion of the charging operation. The detent device 38 additionally provides a pair of peripheral apertures (not shown) into which locking means may be projected to provide an absolute locking of the drive as a safety precaution during maintenance work on the interrupter or operating means.

Suitable shaft bearing means are provided at each end of the shaft 27 as shown at 45 and 46.

Control elements

An integrated control system including a plurality of switches and switch contact pairs is utilized in our invention to assure proper and timely operation of the stored energy device drive and the circuit interrupter which it controls. As mentioned above some of this control apparatus is located within the interrupter housing. The remainder is mounted in or on the drive or motor housings.

FIG. 3 also illustrates the manual operation of one control switch of my invention which permits safe manual operation of the drive. Micro-switch 50 having a movable contact element 51 is mounted on a drive housing support in an area above the clutch mechanism. During motor operation the clutch disc 26 does not touch the switch operating arm 52 which is in engagement with movable contact element 51, operating arm 52 being normally biased by spring 53 about pivot 54 with stop 52a abutting the support wall as shown in FIG. 2.

Upon manual operation which produces the horizontal sliding of shaft 31 and consequent motion of clutch disc 26 to the right away from worm gear 25, clutch disc 26 engages the lower portion of operating arm 52 rotating it about pivot 54. The motion of the switch operating arm 52 to the position of FIG. 3 moves contact element 51 to the left so as to open micro-switch 50. This operation provides a positive opening of the motor control circuits and precludes any motor operation during manual operation.

Two additional micro-switches or limit switches are provided both within the drive housing in a manner shown in FIG. 4 at 55 and 56. These limit switches 55 and 56 are normally closed and operate to open the two motor control circuits to be described more fully hereinafter when the energy storage device hub has been sufficiently rotated to charge the device fully.

Plate 29 in addition to providing a spring retaining means for the clutch assembly spring 30 as shown in FIG. 2 also provides a cam surface 29a which is adapted to effect opening of limit switches 55 and 56.

The rotary travel of plate 29 is confined to a rotation of approximately 160°, as is the rest of the drive unit. Thus when the interrupter is in the open position and the drive is fully rotated in the clockwise direction as viewed from the right in FIGS. 2 and 3, cam surface 29a and plate 29 are in the positions shown in solid lines in FIG. 4. Upon the counterclockwise rotation of the drive, cam surface 29a rotates out of engagement with the contact element 56a of limit switch 56 permitting that switch to close. At this time limit switch 55 is closed permitting the flow of current to the motor armature for counterclockwise rotation until cam surface 29a reaches the dotted line position shown in FIG. 4. The cam surface 29a then actuates contact element 55a of limit switch 55 to open the control circuit thereby cutting off power supply to the motor armature. In practice it has been found that the satisfactory cutoff point at which cam surface 29a opens limit switch 55 is several degrees of rotation prior to the point at which the stored energy device will be fully charged due to the coasting of the drive means after motor cutoff.

The cross-sectional view of the drive shaft 27 shows clearly its square portion.

FIG. 5 shows the auxiliary switching means 23 of our invention which is mounted within the interrupter housing in any suitable manner and actuated by the discharge of stored energy device through shaft 102.

Auxiliary switching means 23 includes auxiliary switch 70 having a plurality of contact pairs 70a, 70b, 70c, 70d, 70e and 70f which will be discussed hereinafter with respect to the circuit diagram of the control system. One set of these contact pairs is closed by the discharge of the stored energy device in closing the circuit interrupter and a second set of contact pairs is closed by the discharge of the stored energy device in opening the interrupter. For both operations the closing of one set of contact pairs opens the other set as illustrated in FIG. 7.

Means are provided to actuate switch 70 by the rotation of shaft 102 including shaft arm 71, link pin 72, link 73 and auxiliary switch arm 74.

Rotation of the stored energy device hub 101 in the counterclockwise direction as viewed from the righthand end in FIG. 2 effects clockwise rotation of shaft 102 as viewed in FIG. 5. The solid lines of FIG. 5 designate the position of the auxiliary switch mechanism during the open condition of the interrupter. The auxiliary switching means is shown in dotted lines in the interrupter-closed position.

Shaft 102 is also connected by shaft arm 71 to an operating arm 103 of the interrupter which operates the interrupter switch blade (not shown).

Thus it can be seen that the discharge of stored energy device 100 is rotating shaft 102 simultaneously operates the interrupter switch blade and the auxiliary switch 70.

*Control circuitry*

Having thus described the drive means of our stored energy device operator and the various control switches used in cooperation therewith the novel circuitry of our control mechanism will now be explained.

Referring to the circuit diagram of FIG. 6, it can be seen that power may be supplied to the motor control circuits through terminal elements 65 and 66 from any suitable source.

Control switches, each related to one of the motor control circuits, are shown at 80 and 90. These control switches may be remotely located with respect to the circuit interrupter.

A pair of relays having movable contacts 81a and 91a connected in parallel with control switches 80 and 90 respectively, may be mounted anywhere on the motor or drive housings. The operating coils 81b and 91b of these relays are connected in series relation with their respective movable contacts 81a and 91a.

For purposes of explanation the auxiliary switch contacts 70a, 70d and 70e, as well as limit switch 55 are shown in the closed position in FIGS. 6 and 7 as would be the case during charging of the stored energy device to close the circuit interrupter.

Assuming that the terminals 65 and 66 are connected to a power supply the closing of control switch 80 to initiate closing of the circuit interrupter permits the flow of current to point 82 where current is divided into an outer holding circuit and a motor control circuit. The current in the outer holding circuit through relay coil 81b and auxiliary switch contacts 70e closes relay contacts 81a insuring the sealing in or continuous supply of current to the motor control circuit after the control switch 80 is opened.

The curent flowing in the inner or motor control circuit passes through limit switch 55, auxiliary switch contacts 70a, motor armature 20a from terminals 1 to 2 thereof, to auxiliary switch contacts 70d and through motor field winding 20b where the inner circuit is joined to the outer circuit at point 83. Energization of the motor armature 20a by this circuit rotates the drive counterclockwise until the contacts of limit switch 55 are opened.

Upon discharge of the stored energy mechanism to close the interrupter, auxiliary switch 70 is actuated as discussed above to open contacts 70a, 70d, and 70e and to close contacts 70b, 70c and 70f. This automatic instantaneous changing of switch contacts by the discharge of the stored energy device provides immediate setting up of the reverse motor armature circuit necessary to recharge the stored energy device for actuation of the interrupter in the opposite direction, i.e. opening.

When in the closed position, the closing of control switch 90 manually or by load conditions in the interrupter circuit will charge the stored energy device and effect opening operation of the circuit interrupter in a manner similar to that set forth for the closing operation. In the interrupter opening circuit current flows through motor armature 20a from terminals 2-1 to rotate the armature and consequently the drive in a clockwise direction.

Of course the clutch switch 50 is serially connected in both of the motor control circuits and opening of the clutch switch during manual operation opens both control circuits.

It can be seen that our invention provides an integrated control system by which a circuit interrupter stored energy device may be operated in either direction either manually or by motor and upon completion of the interrupter closing or opening operation the motor circuit is automatically set up in preparation for the reversing operation. Furthermore, the two control circuits each utilize a branch circuit to seal in the control circuit upon momentary closing of an initiating control switch.

While the invention has thus been disclosed and the presently preferred embodiment described it is not intended that the invention be limited to the specific device shown in the accompanying drawings and discussed in this application. Likewise, it is not intended that the invention be limited to the application discussed herein. Instead many modifications will occur to those skilled in the art which lie within the spirit and scope of the present invention. It is intended that the invention be only limited in scope by the appended claims.

What we claim as new and desire to secure by Letters Patent of the United States is:

1. In combination,
   (a) an operator for a circuit interrupter comprising:
      (1) a motor having an armature,
      (2) a drive connected to said armature, and
      (3) a stored energy device connected to said drive to be charged thereby and operable upon discharge to effect opening or closing of said circuit interrupter;
   (b) first and second power terminals adapted to be connected to a source of power;
   (c) first and second motor control circuits connected to said power terminals for passing current through said armature in first and second directions respectively;
   (d) means in each of said circuits responsive to rotation of said drive to open one of said circuits when the charging of said stored energy device is completed; and
   (e) a pair of control switches, one in each of said circuits, and
   (f) auxiliary switching means having a plurality of pairs of contacts serially connected in each of said circuits and being responsive to the discharge of said stored energy device to open its contacts in one of said circuits and to close its contacts in the other of said circuits to prepare said other circuits for subsequent completion by the control switch therein to effect rotation of said motor in the opposite direction.

2. In combination:
   (a) an operator for a circuit interrupter comprising:
      (1) a motor having an armature,
      (2) a drive connected to said armature comprising a rotatable shaft mounted for axial movement to disconnect said armature from said drive to permit operation of said drive by manual rotation of said shaft, and
      (3) a stored energy device connected to said drive to be charged thereby and operable upon discharge to effect opening or closing of said circuit interrupter;
   (b) first and second power terminals adapted to be connected to a source of power;
   (c) first and second motor control circuits connected to said power terminals for passing current through said armature in first and second directions respectively;
   (d) means in each of said circuits responsive to rotation of said drive to open one of said circuits when the charging of said stored energy device is completed;
   (e) means having a plurality of pairs of contacts serially connected in each of said circuits and being responsive to the discharge of said stored energy device to open its contacts in one of said circuits and close its contacts in the other of said circuits; and
   (f) means serially connected in both of said circuits and responsive to the axial motion of said shaft to to open said circuits to prevent energization thereof during manual operation of the drive.

3. In combination,
(a) an operator for a circuit interrupter comprising:
   (1) a motor having an armature,
   (2) a drive connected to said armature, and
   (3) a stored energy device connected to said drive to be charged thereby and operable upon discharge to effect opening or closing of said circuit interrupter;
(b) first and second power terminals adapted to be connected to a source of power;
(c) first and second motor control circuits connected to said power terminals for passing current through said armature in first and second directions respectively;
(d) means in each of said circuits responsive to rotation of said drive to open one of said circuits when the charging of said stored energy device is completed;
(e) means having a plurality of contact pairs serially connected in each of said circuits and being responsive to the discharge of said stored energy device to open its contacts in one of said circuits and close its contacts in the other of said circuits;
(f) first and second control switches each associated with a corresponding one of said motor control circuits and having contacts for completing the corresponding circuit to initiate charging said stored energy device and
(g) means responsive to the closing of the contacts of said first control switch to establish a holding circuit for the first of said motor control circuits independent of the contacts of said first control switch to provide for maintaining said drive continuously in rotation from the beginning of the charging of said stored energy device until after the beginning of the discharge thereof.

4. In combination,
(a) an operator for a circuit interrupter comprising:
   (1) a motor having an armature,
   (2) a drive connected to said armature, and
   (3) a stored energy device connected to said drive to be charged thereby and operable upon discharge to effect opening or closing of said circuit interrupter;
(b) first and second power terminals adapted to be connected to a source of power;
(c) first and second motor control circuits connected to said power terminals for passing current through said armature in first and second directions respectively;
(d) means in each of said circuits responsive to rotation of said drive to open one of said circuits when the charging of said stored energy device is completed;
(e) means having a plurality of pairs of contacts serially connected in each of said circuits and being responsive to the discharge of said stored energy, device to open its contacts in one of said circuits and close its contacts in the other of said circuits;
(f) first and second control switches each associated with a corresponding one of said motor control circuits and having contacts for completing the corresponding circuit to initiate charging said stored energy device;
(g) means responsive to the closing of the contacts of said first control switch to establish a holding circuit for the first of said motor control circuits independent of the contacts of said first control switch to provide for maintaining said drive continuously in rotation from the beginning of the charging of said stored energy device until after the beginning of the discharge thereof, and
(h) means responsive to the closing of the contacts of said second control switch to establish a holding circuit for the second of said motor control circuits independent of the contacts of said second control switch to provide for maintaining said drive continuously in rotation from the beginning of the charging of said stored energy device until after the beginning of the discharge thereof.

5. In combination,
(a) an operator for a circuit interrupter comprising:
   (1) a motor having an armature,
   (2) a drive connected to said armature, and
   (3) a stored energy device connected to said drive to be charged thereby and operable upon discharge to effect opening or closing of said circuit interrupter;
(b) first and second power terminals adapted to be connected to a source of power;
(c) first and second motor control circuits connected to said power terminals for passing current through said armature in first and second directions respectively;
(d) means in each of said circuits responsive to rotation of said drive to open one of said circuits when the charging of said stored energy device is completed;
(e) means having a plurality of pairs of contacts serially connected in each of said circuits and responsive to the discharge of said stored energy device to open its contacts in one of said circuits and to close its contacts in the other of said circuits;
(f) first and second control switches each associated with a corresponding one of said motor control circuits and having contacts for completing the corresponding circuit to initiate charging said stored energy device and
(g) first and second relay means associated with said first and second motor control circuits respectively, each of said relay means being responsive to the closing of a corresponding one of said control switches to establish a holding circuit for the corresponding one of said motor control circuits to provide for maintaining said drive continuously in rotation from the beginning of the charging of said stored energy device until after the beginning of the discharge thereof, each of said relay means comprising an operating coil in circuit with the contacts of the corresponding control switch and contacts in parallel with the contacts of said corresponding control switch.

6. In combination:
(a) an operator for a circuit interrupter comprising:
   (1) a motor having an armature,
   (2) a drive connected to said armature and
   (3) a stored energy device connected to said drive to be charged thereby and operable upon discharge to effect opening or closing of said circuit interrupter;
(b) first and second power terminals adapted to be connected to a source of power;
(c) first and second motor control circuits connected to said power terminals for passing current through said armature in first and second directions respectively;
(d) means in said first circuit responsive to rotation of said drive in a first direction to open said first circuit when the charging of said stored energy device to close said interrupter is completed;
(e) means in said second circuit responsive to rotation of said drive in a second direction to open said second circuit when the charging of said stored energy device to open said interrupter is completed and
(f) auxiliary switching means having a first plurality of pairs of contacts and a second plurality of pairs of contacts, responsive to the interrupter-closing discharge of said stored energy device to open its contacts in said first circuit and close its contacts in said second circuit and responsive to the interrupter-opening discharge of said stored energy device to close its contacts in said first circuit and open its contacts in said second circuit, at least two of said first plurality of pairs of contacts being serially connected in said first circuit and at least two of said second plurality of pairs of contacts being serially connected in said second circuit.

7. In combination:
(a) An operator for a circuit interrupter comprising:
  (1) a motor having an armature,
  (2) a drive connected to said armature, and
  (3) a stored energy device connected to said drive to be charged thereby and operable upon discharge to effect opening or closing of said circuit interrupter;
(b) first and second power terminals adapted to be connected to a source of power;
(c) first and second motor control circuits connected to said power terminals for passing current through said armature in first and second directions respectively;
(d) means in each of said circuits responsive to rotation of said drive to open one of said circuits when the charging of said stored energy device is completed;
(e) means having a first plurality of pairs of contacts and a second plurality of pairs of contacts responsive to the interrupter closing-discharge of said stored energy device to open said first plurality of pairs of contacts and close said second plurality of pairs of contacts and responsive to the interrupter-opening discharge of said stored energy device to close said first plurality of pairs of contacts and open said second plurality of pairs of contacts, at least two of said first plurality of pairs of contacts being serially connected in said first circuit, and at least one of said second plurality of pairs of contacts being serially connected in said second circuit and
(f) first and second relay means associated with said first and second motor control circuits respectively, each of said relay means being responsive to the closing of a corresponding one of said control switches to establish a holding circuit for the corresponding one of said motor control circuits to provide for maintaining said drive continuously in rotation from the beginning of the charging of said stored energy device until after the beginning of the discharge thereof, each of said relay means comprising an operating coil in circuit with the contacts of the corresponding control switch and contacts in parallel with the contacts of said corresponding control switch.

References Cited by the Examiner
UNITED STATES PATENTS

| | | | |
|---|---|---|---|
| 1,103,528 | 7/14 | Morse | 318—266 X |
| 2,726,363 | 12/55 | Scully | 318—379 X |
| 2,755,423 | 7/56 | Hager | 318—266 X |

ORIS L. RADER, *Primary Examiner.*